United States Patent [19]
Crandall et al.

[11] Patent Number: 5,995,553
[45] Date of Patent: Nov. 30, 1999

[54] ENCODER/DECODER FOR EMERGENCY ALERT SYSTEM

[75] Inventors: Kenneth Crandall, Redwood City; Kenneth Fesler, Stanford, both of Calif.

[73] Assignee: TFT, Inc., Santa Clara, Calif.

[21] Appl. No.: 08/789,296

[22] Filed: Jan. 28, 1997

[51] Int. Cl.$^6$ .................................................. H04L 27/10
[52] U.S. Cl. ........................ 375/272; 455/404; 455/521
[58] Field of Search .................................. 375/219, 222, 375/272, 303, 334, 242; 340/870.09, 901, 870, 945; 329/300, 315; 332/100, 118, 117; 348/14; 455/404, 521, 527

[56] References Cited

U.S. PATENT DOCUMENTS

| | | | |
|---|---|---|---|
| 4,692,742 | 9/1987 | Raizen et al. | 340/539 |
| 4,873,520 | 10/1989 | Fisch et al. | 340/825.44 |
| 4,956,866 | 9/1990 | Bernstein et al. | 704/274 |
| 5,038,402 | 8/1991 | Robbins | 455/3 |
| 5,045,839 | 9/1991 | Ellis et al. | 340/539 |
| 5,148,153 | 9/1992 | Haymond | 340/461 |
| 5,241,689 | 8/1993 | Schwed et al. | 455/54.1 |
| 5,420,888 | 5/1995 | Davis et al. | 375/334 |
| 5,533,062 | 7/1996 | Liberti, Jr. et al. | 375/334 |
| 5,564,073 | 10/1996 | Takahisa | 455/66 |

OTHER PUBLICATIONS

Article by Frederick M. Baumgartner entitled Upgrading The Emergency Broadcast System: published during the year 1993.
Article by TFT, Inc. and submitted by Frederick M. Baumgartner, entitled "Emergency Information System" circulated on Dec. 11, 1992 at a Federal Communication Conference in Washington, D.C.

*Primary Examiner*—Wellington Chin
*Assistant Examiner*—Congvan Tran
*Attorney, Agent, or Firm*—Jack M. Wiseman

[57] ABSTRACT

An encoder/decoder for an emergency alert system to enable broadcasters to receive, store, re-broadcast and originate emergency alert messages. Multiple emergency alert signals are received by the encoder/decoder. A digital signal processor of the encoder/decoder scans the reception of the multiple emergency alert messages to determine the presence of an incoming emergency alert signal. The digital signal processor provides digital implementation of a frequency shift key modulation and a frequency shift key demodulation to encode and decode emergency alert messages. Additionally, the digital signal processor functions as a central processing unit to control input/output ports over a digital signal processor bus for performing all encoding and decoding functions and to control all encoding and decoding functions.

21 Claims, 8 Drawing Sheets

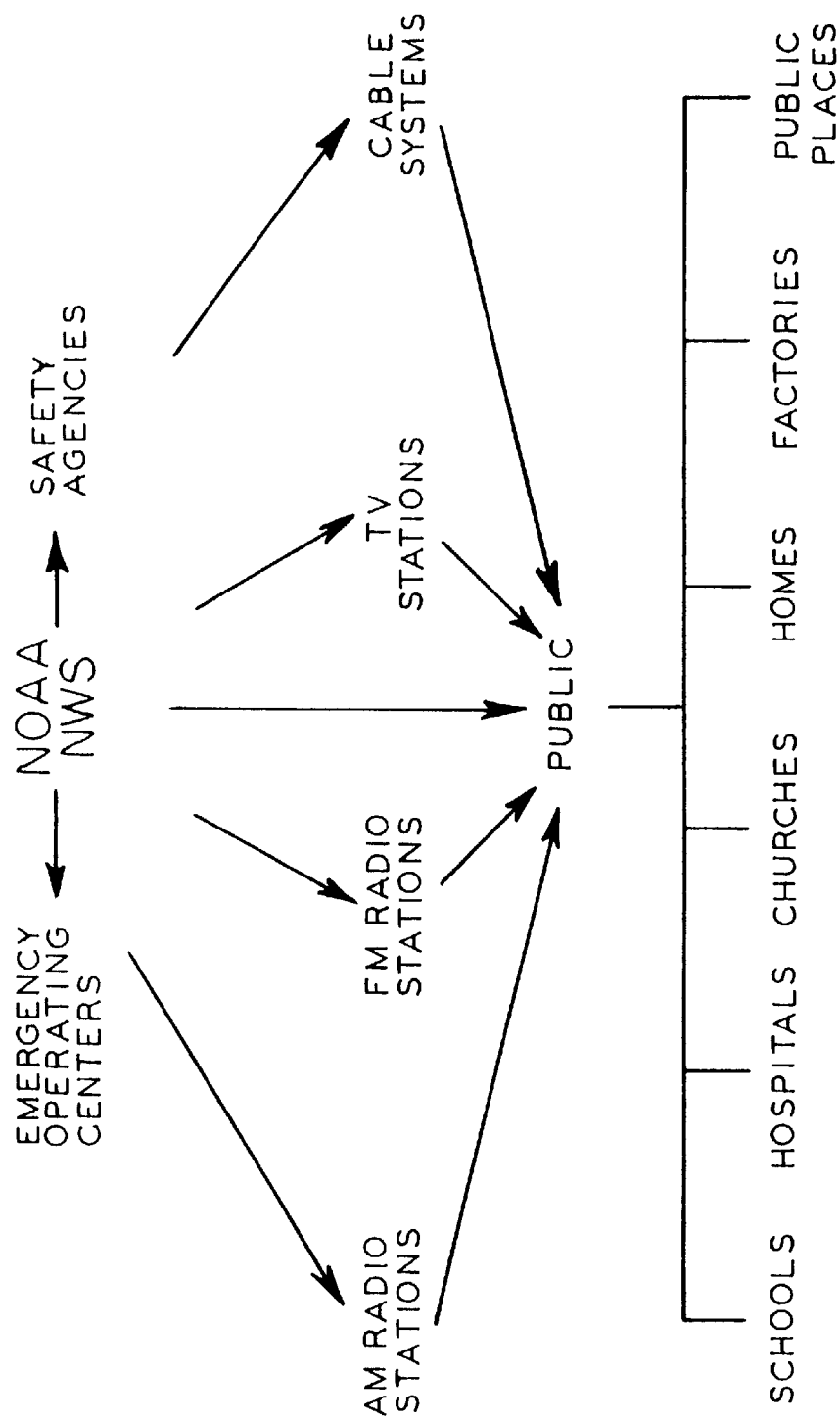

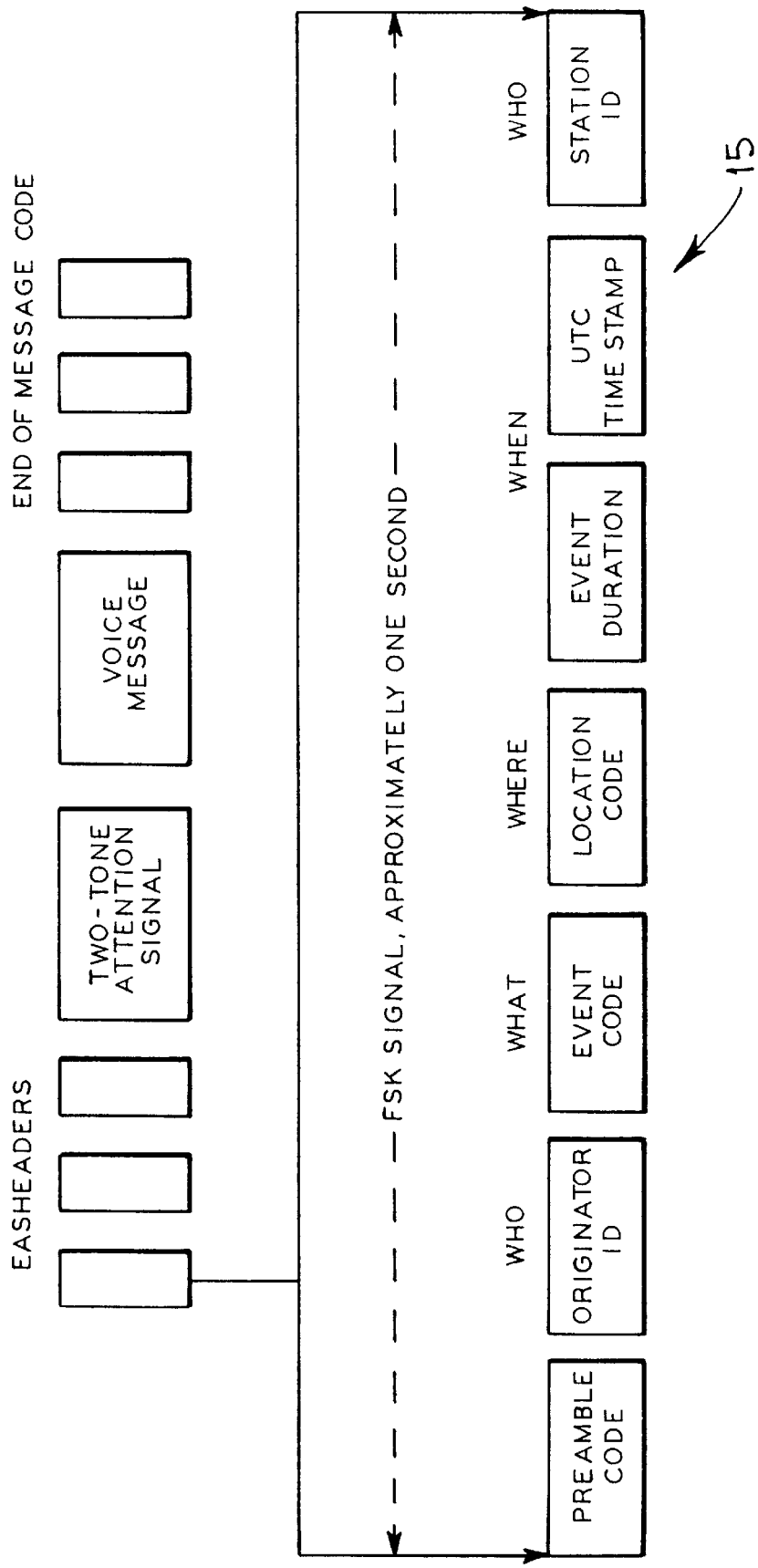

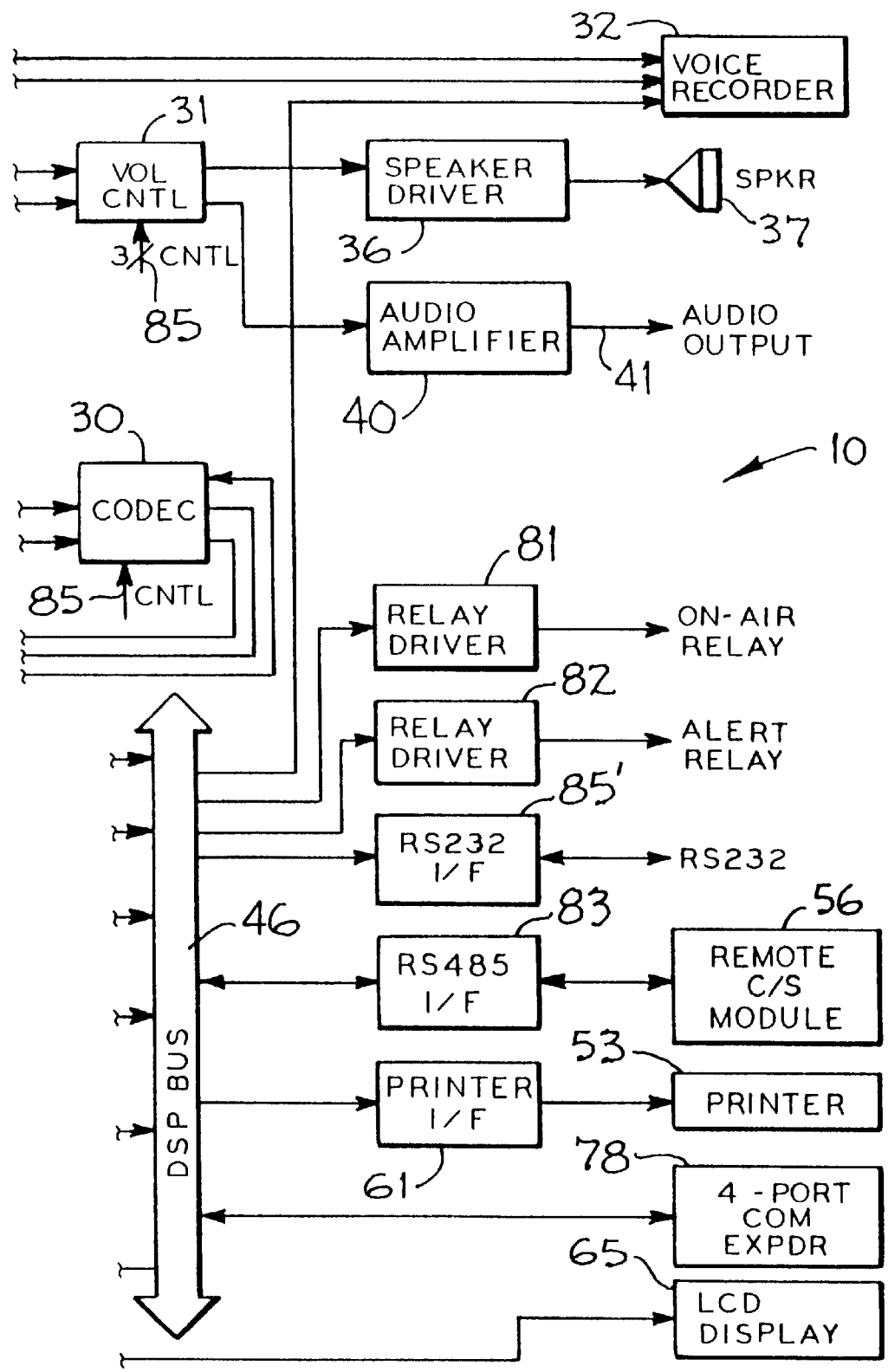
fig_3B

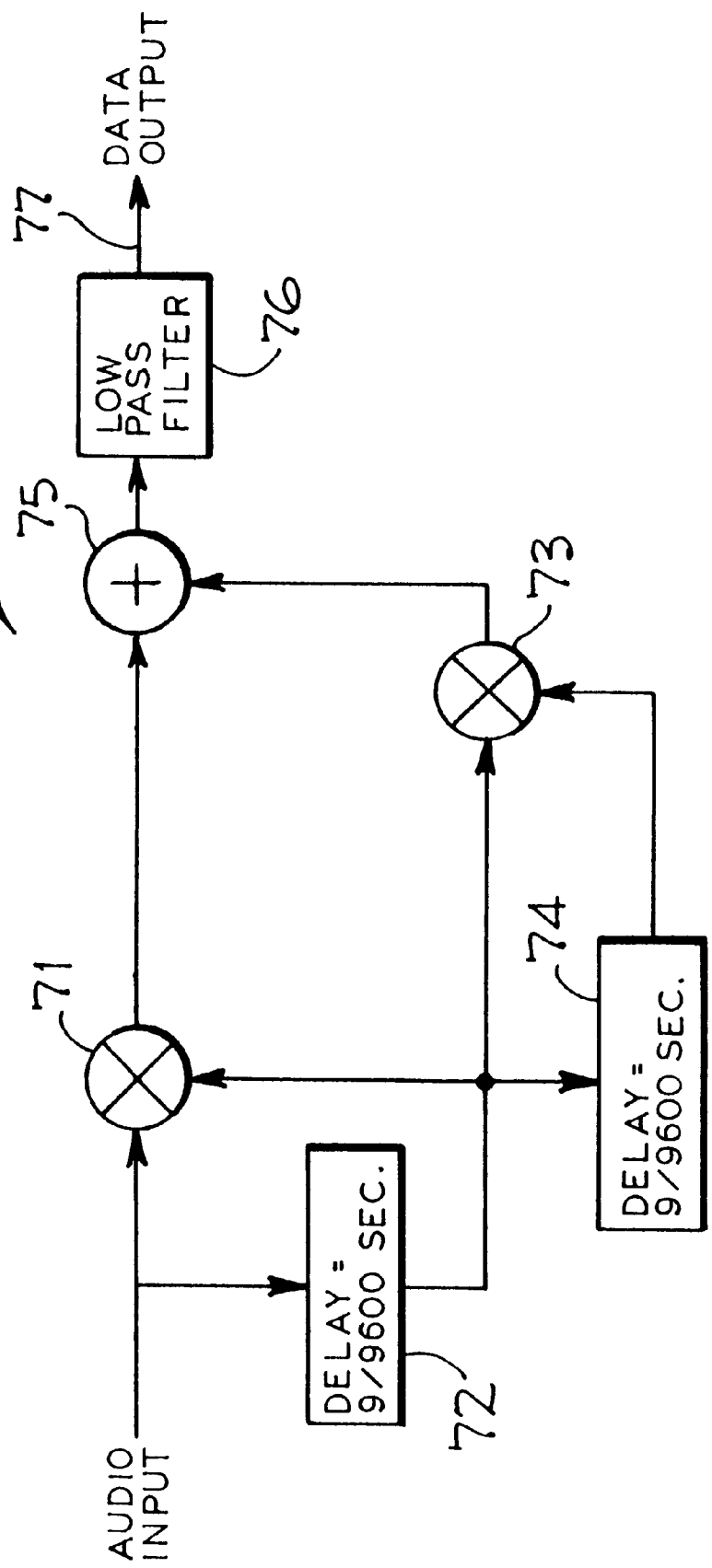

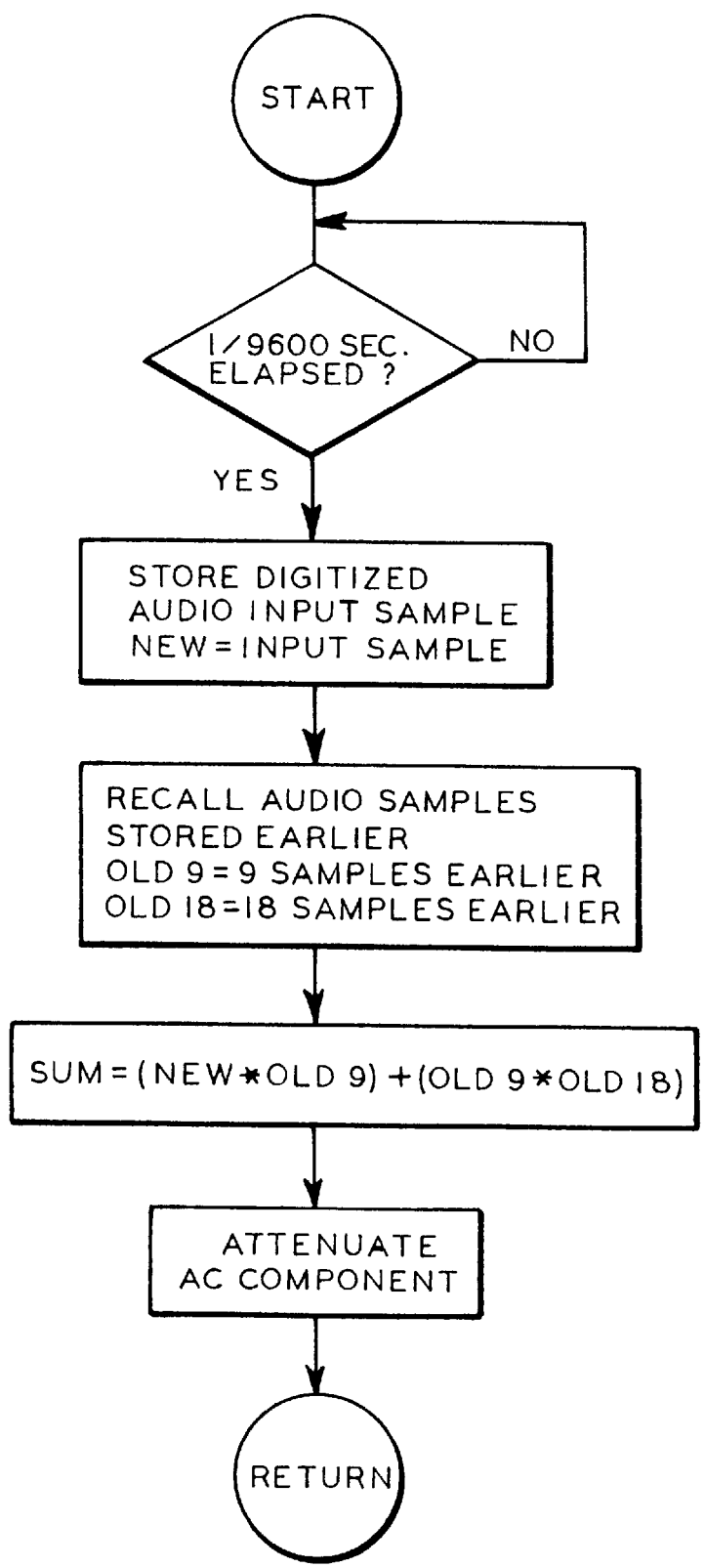

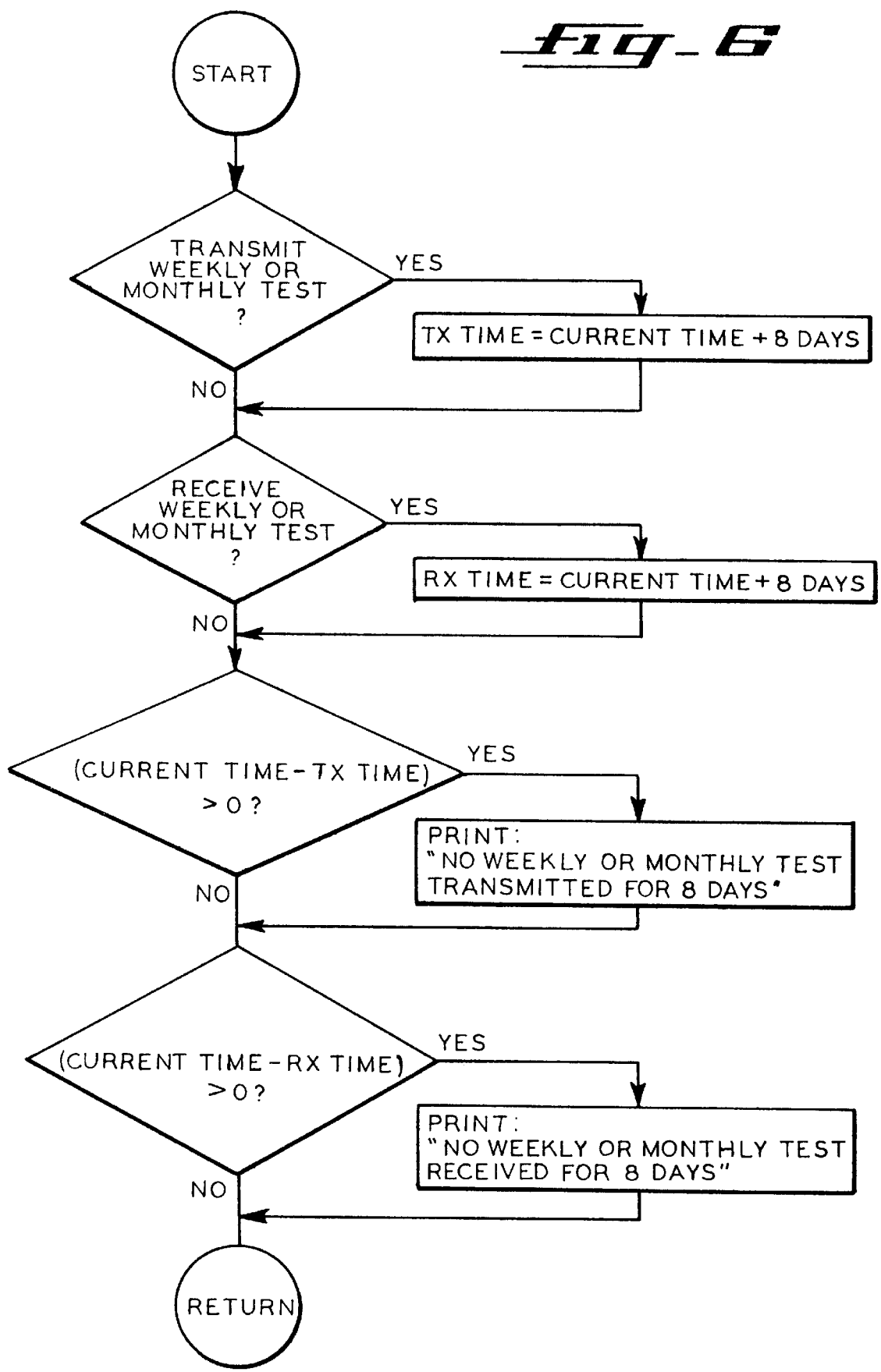
fig_6

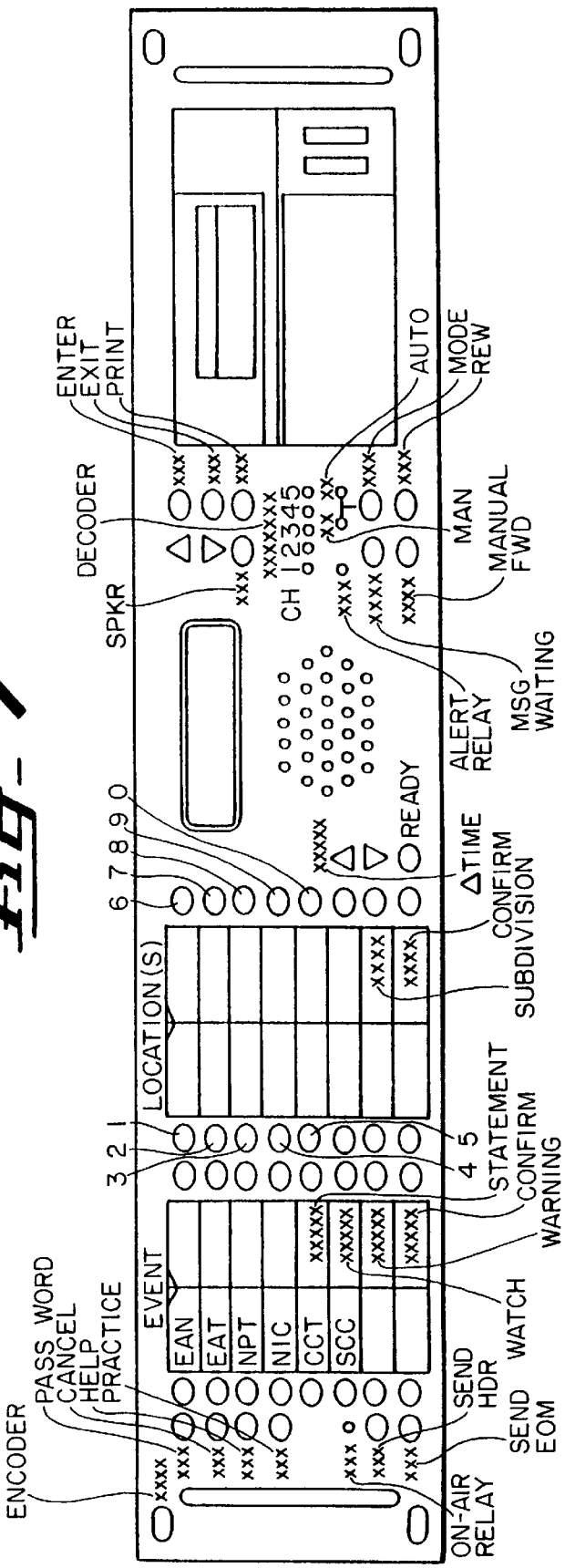

ENCODER/DECODER FOR EMERGENCY ALERT SYSTEM

BACKGROUND OF THE INVENTION

The present invention relates in general to encoder/decoders, and, more particularly, to an encoder/decoder for an emergency alert system.

The patent to Ganzer et al., U.S. Pat. No. 5,121,430, issued on Jun. 9, 1992, for Storm Alert For Emergencies, discloses an emergency alert system. The emergency alert system includes a code generator which is part of a broadcast transmission system. The code generator produces a composite code signal. One component of the composite code signal designates a geographical area for receiving a message. Another component of the composite code signal designates the alert message for the designated geographical area. The composite code signal is encrypted and the encrypted composite code signal modulates an audio carrier by frequency shift keying. Remote receivers are tuned to the broadcast transmitter. The receivers demodulate the encrypted composite code signal and recovers therefrom the composite signal. A data comparison circuit within the receivers compares the user location code with the designated geographical location code. If a match is detected a selected number of times over a predetermined time period, the receivers in which the match is detected will activate an alarm and the alert message is reproduced by the receiver. The broadcast transmitter may be a television transmitter and the remote receivers may be television receiver circuitry.

In the patent to Permut et al., U.S. Pat. No. 4,155,042, issued on May 15, 1979, for Disaster Alert System, there is disclosed a central alert station. The central alert station includes a code selector and transmits coded radio frequency activation signals specifying the geographical area. The central alert station also transmits audio signals containing an audio message. Simultaneous transmission of the coded activation signal and the audio signal are possible by multiplexing both signals on the same frequency by employing a multiplexer. A plurality of radio frequency receivers are remotely located. The output of each of the radio frequency receivers is supplied to a decoder, which analyzes the coded radio frequency activation signal. Detection of a coded activation signal by the decoder results in the activation of power circuits. Each decoder is coupled to its associated radio frequency receiver and enables user entry of the location code corresponding to the geographical area of the associated receiver. Activation of the power circuits results in the operation of an audible alarm, a display of a visible alarm, reproduction of an audio message, and the activation of desired auxiliary units.

The patent to Giallanza et al., U.S. Pat. No. 4,383,257, issued on May 10, 1983, for Message Communication System With Message Storage, discloses a transmission system. The transmission system developes a binary encoded data train having a header followed by a message. The data train is applied to a carrier frequency to modulate the carrier using frequency shift key techniques. The header uses synchronizing signals, one or more address signals, and a message. One or more receivers receive the message in response to an address signal in the header. The digital data is converted into audio signals for modulating the transmitted signal by frequency modulation. A receiver/demodulator detects the binary encoded data train and demodulates the carrier modulated by the audio frequencies into the corresponding sequence of binary logic levels. The demodulated digital data is then applied to a bit synchronizer that synchronizes the internal clocks of the receiver to the incoming data train so that each of the binary data bits can be sampled and applied to a decoder. The decoder stores the message prior to display of the message on a visual alphanumeric display.

In the patent to Bernard et al., U.S. Pat. No. 4,956,875, issued on Sep. 11, 1990, for Emergency Radio Alerting And Message Transmitting System Directable To Selected Classes And Numbers Of Receivers, there is disclosed an emergency radio alerting and warning system. The emergency radio alerting and warning system includes a frequency modulated transmitter. The broadcast signal from the frequency modulated transmitter uses an encoder to provide a code to enable broadcasting to be made to particular receivers in a selected geographical location. The broadcast signal is a composite signal that also includes sound messages and audible alarms. Frequency modulated receivers are receptive, but inactive, until the specific encoded geographical signal at frequency modulated receivers is received. Upon detecting the specific encoded geographical signal, the activated frequency modulated receivers activate an audible alarm followed by the alert message.

The patent to Rush, No. U.S. Pat. No. 5,030,948, issued on Jul. 9, 1991, for Multiple Characteristic Sensitive Addressing Scheme For A Multiple Receiver Data Network, discloses a data transmission network. The data transmission network includes a transmitter for transmitting messages via a radio wave type communications medium, such as a sub-audible carrier or a frequency modulated broadcast band or an ultra high frequency television spectrum for incorporation into existing television transmission. The data transmission is a composite signal that includes a code component and a message component. Receivers compare the code component. Should the code of the receiver match the transmitted code, then the message is stored. The stored message may be outputted by alternative apparatus including a circuit capable of generating audio from digital data.

In an article circulated on Apr. 18, 1993, by Frederick M. Baumgartner of TFT, Inc. of Santa Clara, Calif., at an NAB Convention in Las Vegas, Nev., there is disclosed an emergency broadcast system in which a microprocessor scans audio and data sources for emergency information. The emergency broadcast system employs a header containing location and emergency alert information. The emergency alert information is decoded by a receiver system that scans between several information sources. Decoders scan or monitor looking for the emergency information source preamble and data. Decoders decode the original emergency information source header, data and end of message and then regenerate the frequency shift keying of the emergency information system signal. The sources of emergency information, which provide audio signal input are connected to an audio bus. A voice storage is provided for review or rebroadcast of emergency information. The emergency information system utilizes all electronic media, including broadcast television, radio, cable delivered services, satellite services, data services, and government and private warning services.

SUMMARY OF THE INVENTION

An object of the present invention is to provide an encoder/decoder for an emergency alert system at a relatively low cost with relatively easy operation and installation.

Another object of the present invention is to provide an encoder/decoder for an emergency alert system that has greater accuracy in the detection of additional waveforms.

Another object of the present invention is to provide an encoder/decoder for an emergency alert system that is more tolerant to distortions in the reception of audio input signals.

Another object of the present invention is to provide an encoder/decoder for an emergency alert system that has improved signal to noise ratio performance and greater tolerance to phase distortion.

Another object of the present invention is to provide an encoder/decoder for an emergency alert system in which there is improved selectivity in the detection of incoming audio signals.

Another object of the present invention is to provide an encoder/decoder for an emergency alert system in which test reminder messages are displayed when the encoder/decoder has not transmitted or received test messages within a prescribed period of time.

BRIEF DESCRIPTION OF THE DRAWINGS

FIG. 1 is a diagrammatic illustration of a web structure for an emergency information superhighway.

FIG. 2 is a diagrammatic illustration of a timing diagram of a header and message encoded and decoded by the encoder/decoder of the present invention.

FIG. 4 is a block diagram of a delay and multiplier for a frequency shift key demodulator employed in a digital signal processor of the encoder/decoder shown in FIG. 3.

FIG. 5 is a flow chart for the delay and multiplier for the frequency shift key demodulator employed in the digital signal processor of the encoder/decoder shown in FIG. 3.

FIG. 6 is a flow chart of the weekly/monthly test reminder of the digital signal processor of the encoder/decoder shown in FIG. 3.

FIG. 7 is a front elevation view of the front panel for the encoder/decoder embodying the present invention.

DETAILED DESCRIPTION OF THE PREFERRED EMBODIMENT

Figure 3A:
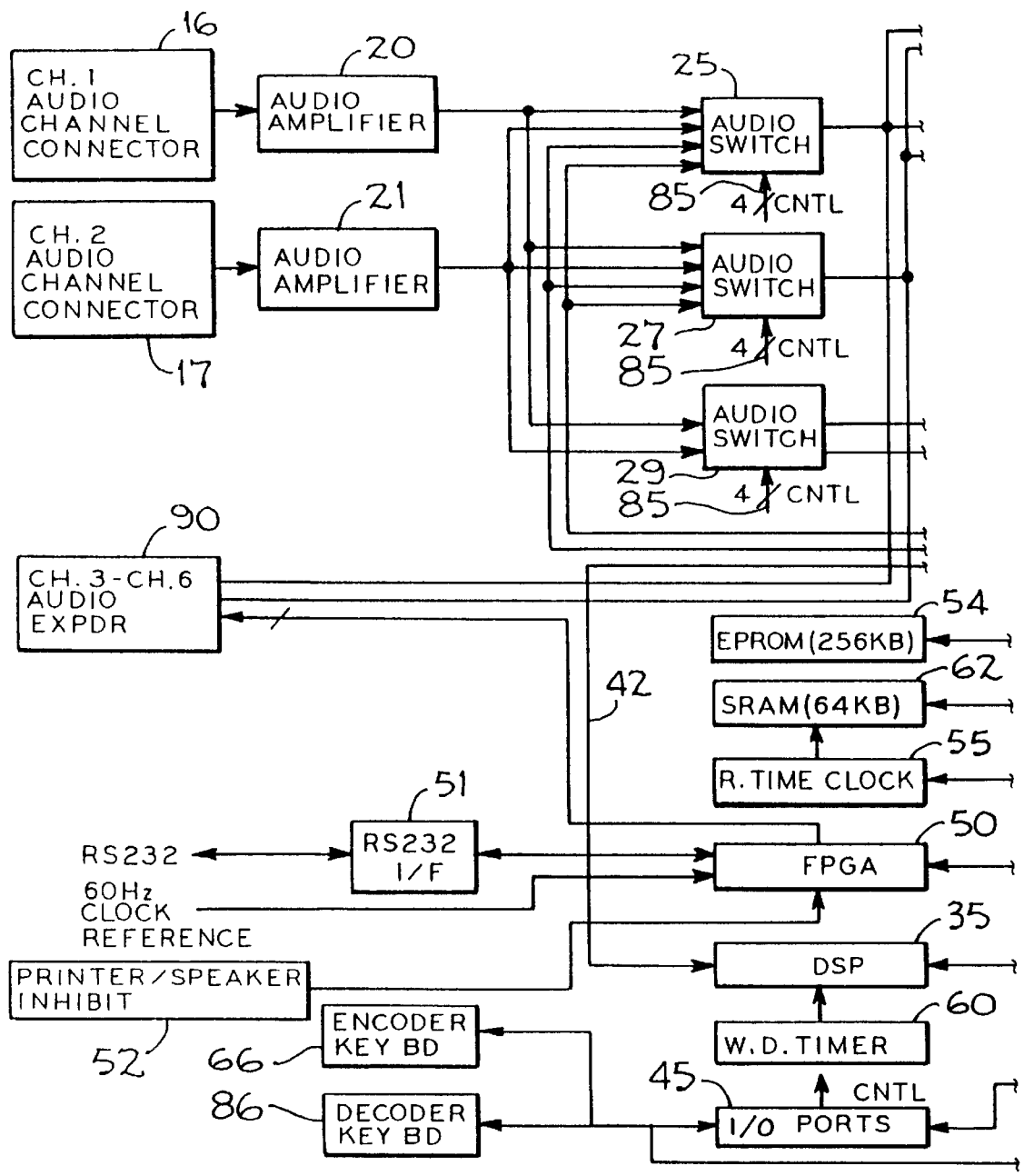
FIG. 3 is a block diagram of the encoder/decoder embodying the present invention.

The encoder/decoder 10 of the present invention enables broadcasters to receive, store, re-broadcast and originate emergency alert messages. When an agency, such as the National Weather Service or the Emergency Operations Center, issues an alert message, it transmits a digital emergency alert header and a voice message through the encoder/decoder of the present invention to a local AM, FM or television station. The encoder/decoder 10 is located at the site of the local AM, FM or television station employing the same. The local AM, FM or television station, in turn, re-broadcasts the voice message to remotely located AM, FM or television receivers. By way of example, a web structure for emergency alert system information superhighway is diagrammatically illustrated in FIG. 1 wherein agencies, such as the Emergency Operating Centers, National Weather Service and other similar agencies, originate alert messages and transmit a digital emergency alert system header 15 (FIG. 2) and a voice message to a local AM, FM, or television station, which, in turn, broadcasts the voice message to remotely located receivers designated for receiving the voice messages, such as receivers located in a designated geographical area.

Multiple emergency alert signals from respective emergency alert systems are applied respectively to audio channel connectors 16 and 17. Interfaced, respectively, with the audio channel connectors 16 and 17 are balanced audio amplifiers 20 and 21. Connected to the output of the audio amplifiers 20 and 21 are suitable audio or analog switches 25–27. The audio switches 25–27 route the output signals from the balanced audio amplifiers 20 and 21 to a coder/decoder (codec) 30.

The codec 30 converts audio signals to digital signals and converts digital signals to audio signals. In addition thereto, the codec 30 converts digital data signals generated by a digital signal processor 35 to audio signals. The codec 30 is a combination of a coder and decoder operating in different directions of transmission within the encoder/decoder 10. In the exemplary embodiment, the codec 30 is of the type manufactured by Texas Instruments Corporation of Dallas, Tex., as the TCM320AC37N.

The audio switches 25–27 also route the output of the audio amplifiers 20 and 21 to a volume control 31 and a digital voice recorder 32. The output of the volume control 31 is applied to a speaker driver 36, which is connected to a front panel speaker 37 of the encoder/decoder 10. The volume control 31 is adjusted by software to regulate the audio level of the panel speaker 37. In addition thereto, the volume control 31 also adjusts the output of the audio amplifier 40 to regulate the audio level of emergency alert signals applied to a local transmission system, not shown, over a conductor 41. The volume control 31 is manufactured and sold by Maxim Integrated Products of Sunnyvale, Calif., as the MAX532B095. Should the alert message be verified by the digital signal processor 35 for re-transmission over the conductor 41, it will have a new station identification code inserted therein and it will include a two-tone attention signal, a recorded voice message, and an end of message signal. Each header code message and each end of message code will be preceded by a digital preamble code of the digital emergency alert system header 15.

The digital voice message recorder 32 digitizes and stores voice messages for playback or for re-broadcast. It is a sampling analog-to-digital converter and a digital-to-analog converter that converts incoming voice messages to digital data and stores the digital data in voice memories thereof at select memory locations for voice storage. In the exemplary embodiment, the last incoming audio message, up to two minutes, is available for the operator's immediate review. The operator can decide whether to forward the last message received after review of the header 15 and the voice message. The digital voice message recorder 32 allows automatic forwarding of the voice message without using an external recording device.

To play back a message, the digital voice recorder 32 retrieves digital data from the voice memories thereof and converts the data back into its original analog form. Audio signal buffering, gain and automatic level control are provided by the digital voice recorder 32. Okidata Corp. of Milpitas, Calif., manufactures and sells the digital voice recorder 32 as manufacturing part number MSM 6389 QFP, which stores the digital data, and as manufacturing part number MSM 6389 QFJ, which is the controller for the digital voice recoder 32.

The digital signal processor 35, which is manufactured and sold by Texas Instruments Corporation of Dallas, Tex., as the TMS320C26, scans the multiple audio input signals applied to the channel connectors 16 and 17 by way of the audio switches 25–27, codec 30 and a conductor 42 to determine the presence of an incoming signal representing an emergency alert message. In addition thereto, the digital signal processor 35 provides a digital implementation of a frequency shift key modulator and a frequency shift key demodulator to encode and decode emergency alert messages. The digital signal processor 35 functions as a central processing unit to control input/output ports 45 over a digital signal processor bus 46 for selecting the switching operation of the audio switches 25–27; and to adjust the volume control 31 for regulating the audio level of the panel speaker 37 and the audio level of the emergency alert message to a broadcast transmission system, not shown. Thus, the digital signal processor 35 performs all encoding and decoding functions and controls all input/output activity.

A field programmable gate array 50, which is manufactured and sold by Xilinx, Inc. of San Jose, Calif., as the XC3042, is operatively controlled by the digital signal processor 35 through the digital signal processing bus 46 to generate all internal timing signals and to perform internal digital signal routing. Connected to the field programmable gate array 50 is a bi-directional RS-232 interface 51, which provide ASCII data input of emergency alert system messages. In the exemplary embodiment, the rate for the data output is 1200 baud. In the exemplary embodiment, a 60 Hz clock reference is applied to the field programmable gate array 35 from a suitable source, not shown. Also applied to the field programmable gate array circuit 50 is a printer/speaker inhibit 52. The printer/speaker inhibit 52 inhibits or mutes a printer 53 and the speaker 37 when desired by closing a normally opened switch or relay contacts, not shown.

A real-time clock circuit 55 under the control of the digital signal processor 35 over the digital signal processor bus 46 maintains a calendar and time of day. The real-time clock circuit 55 is manufactured and sold by Dallas Semiconductor of Dallas, Tex., as the DS14285. The output of the real-time clock circuit 55 is connected to a set-up memory or system random access memory 62, which is used for temporary data storage and calculations as well as long term storage of setup information. The system random access memory 62 communicates with the digital signal processor 35 through the digital signal processor bus 46. The event and location data of the header 15 (FIG. 2) is compared with the data stored in the system random access memory circuit 62 by the signal digital processor 35 for validation to determine whether the incoming message should be re-transmitted through the encoder/decoder 10.

A system read-only program memory 54 stores the instructions for the operation of the encoder/decoder 10 and the encoding and decoding software for the digital signal processor 35. The system read-only program memory 54 is connected to the digital signal processor 35 through the digital signal processor bus 46. The operating system software, the encoding software and the decoding software are stored in the system read-only program memory 54. A reset circuit and watchdog timer 60 provides power-on and default/time-out reset for the digital signal processor 35 and the central processing unit thereof.

The digital signal processor 35 provides output message information for the printer 53 through the digital signal processor bus 46 and a printer interface 61. The routing of data to the printer 53 is controlled by the field programmable gate array 50 and the input/output ports 45 under instructions from the digital signal processor 35. The printer 53, in the exemplary embodiment, is an ASCII impact printer, which has 24 columns to record emergency alert signal messages received and transmitted to the encoder/decoder 10. The digital header data and the incoming message are printed out by the printer 53.

In addition to the foregoing, the digital signal processor 35 controls the current output status of a liquid crystal display 65. The field programmable gate array 50, upon instructions from the digital signal processor 35, controls the routing of data to the liquid crystal display 65 through the input/output ports 45. It is the liquid crystal display 65 that scrolls incoming messages provided by the digital signal processor 35. The scrolling of incoming messages accommodates long messages. Further, the liquid crystal display 65 also displays encoder functions, message forwarding and configuration setups. The digital header 15 with the incoming message is decoded and transmitted by the digital signal processor 35 to the liquid crystal display 65 and the printer 53 through the digital signal processor bus 46. The data and message information displayed in the liquid crystal display 65 is printed out on the printer 53. In the exemplary embodiment, the liquid crystal display 65 is a large character, backlighted display with contrast and backlayer controlled by software. Suitable liquid crystal displays are manufactured and sold by T-tech Corporation of Alamosa, Colo., as the TLCD1616DLGY and by Data International Co. of Taipei, Taiwan, as the VD-1610-1SFDLY.

The digital signal processor 35 is programmed to differentiate between incoming frequency shift key frequencies in which emergency alert system data is encoded. The frequency shift key frequencies, in which emergency alert data system data is encoded, are converted by the digital signal processor 35 to digital data by frequency shift key demodulation. In the exemplary embodiment, the instantaneous frequency of each frequency shift key frequency is shifted between a mark frequency of 2083.3 Hz and a space frequency of 1562.5 Hz, which corresponds to the digital values of 0 and 1 of the ASCII data being transmitted to the audio channel connectors 16 and 17.

The digital signal processor 35 performs frequency shift key modulation and frequency shift key demodulation for the encoder/decoder 10. In FIG. 4, there is illustrated a delay and multiplier 70 for the frequency shift key demodulation performed by the digital signal processor 35. The frequency shift key demodulation performed by the digital signal processor 35 improves the signal to noise ratio performance of the encoder/decoder 10 by including information from additional points on the input waveform spaced to achieve a 180 degree mark/space phase difference between the mark frequency of 2083.3 Hz and the space frequency of 1562.5 Hz. This phase difference improves the mark/space decision process. The frequency shift key demodulation performed by the digital signal processor 35 increases the tolerance of phase distortion performance.

Toward this end, the delay and multiplier 70 for the frequency shift key demodulation performed by the digital signal processor 35 comprises a multiplier 71. One input of the multiplier 71 has applied thereto an audio input signal originating from an audio input channel connector, such as the audio input channel connector 16. Another input of the multiplier 71 has applied thereto the audio input signal originating from the same audio input channel connector through a time delay 72. In the exemplary embodiment, the time delay is 9/9600 second. The same audio input signal is applied to one input of a multiplier 73 through the delay 72 and a delay 74. In the exemplary embodiment, the delay 74 is 9/9600 second. The product of the multiplier 71 and the product of the multiplier 73 are added by an adder 75. The output of the adder 75 is applied as data output through a low pass filter 76 to enable the digital signal processor 35 to make improved mark/space decisions. The additional delay and multiplier 70 maximizes the difference between mark and space to improve the decision process of the digital signal processor 35. A flow chart for the delay and multiplier 70 is shown in FIG. 5.

By virtue of the additional delay and multiplier 70, the encoder/decoder 10 is more tolerant to distortions in the reception of audio input signals and there is greater selectivity in the selection of incoming audio signals. Thus, the encoder/decoder 10 has greater accuracy in the detection of additional waveforms.

The encoder/decoder 10 is activated by the emergency alert signals. In the exemplary embodiment, the emergency alert signals include a preamble and header codes; a two-tone attention signal; a voice message; and the preamble and end of message codes (FIG. 2). The emergency alert signals are applied to an audio channel connector, such as the audio channel connectors 16 and 17, respectively. The preamble and header codes, modulated by audio frequency shift keying, are transmitted to respective audio channel connectors 16 and 17. In the exemplary embodiment, the audio frequency shift keying of the preamble and header codes is at a rate of 520.83 bits per second. In the exemplary embodiment, the mark frequency of the audio frequency shift keying is 2083.3 Hz and the space frequency is 1562.5 Hz. The mark and space times, in the exemplary embodiment, are 1.92 milliseconds. In the exemplary embodiment, the characters are ASCII 7-bit characters, as defined in ANSI X3.4-1977, ending with an eighth null bit (either 0 or 1) to constitute a full eigth-bit byte. The attention signal is transmitted after the header code, and, in the exemplary embodiment, is made up of two simultaneous tones. In the exemplary embodiment, the fundamental frequencies of the attention signal are 853 Hz and 960 Hz.

The emergency alert signal header 15 is digitally coded and encodes the following signals: preamble code, originator identification code, event code, location code, event duration, time stamp, and station identification. The originator identification code indicates who originally initiated the activation of the emergency alert system. The event code indicates the nature of the emergency alert message. The location code indicates the geographic area designated to receive the emergency alert message. The event duration code indicates the valid time period for the alert message. The time stamp code sets forth the day of the year and the time of the day that the message was initially released by the originating agency. Lastly, the station identification is the call sign or other station identification of the broadcast station or agency office transmitting or re-transmitting the emergency alert message. In the exemplary embodiment, for reliability the header 15 is repeated three times and the header preamble code of the header 15 is repeated before each of the three end of message codes.

The digital header 15 in the incoming emergency alert message is decoded and translated by the digital signal processor 35 and then displayed on the liquid crystal display 65 and printed out on the printer 53. The digital signal processor 35 compares the event code and the location code of the digital header 15 with data stored in the system random access memory 62 for validation to determine whether the emergency alert signal and the voice message should be re-transmitted over the audio output conductor 41. Should the event code and the location code match the data stored in the system random access memory 62, or be validated, then the digital signal processor 35 inserts the stored station identification code and re-transmits the header code, the two-tone attention signal, the voice message and an end of message signal through the audio amplifier 41 and over the audio output conductor 41. The audio switches 25–27 are selectively activated by the digital signal processor 35 via the input/output ports 45 to switch the encoder/decoder 10 between the decoding and translating mode and the re-transmitting mode over the audio output conductor 41. A bidirectional RS 232 port 85' provides for data output. In the exemplary embodiment, the data is at 1200 baud.

Additionally, the input/output ports 45 route data to a four-port communication expander 78, which provides communication links to selected equipment, such as a character generator or a password computer controller. Further, the input/output ports 45 route data to the audio switches 25–27 and an on-air relay driver 81 and an alert relay driver 82 to control external devices. The on-air relay has normally opened contacts and the relay contacts close when a valid emergency alert signal is transmitted from the encoder/decoder 10 to illuminate an on-air light (FIG. 7). The alert relay has normally opened contacts and the relay contacts close when a valid emergency alert signal is received from the encoder/decoder 10 to illuminate an alert light (FIG. 7). An RS485 interface port 83 provides a communication path for external remote control/status module 56 between the digital signal bus 46 and the remote control/status module 56. The external remote control/status module 56 is a remotely located transceiver that controls the status of the encoder/decoder 10 and receives messages from the digital signal processor 35. The input/output ports 45 route control signals to the audio switches 25–27, the volume control 31, and the codec 30 over conductors 85.

In the exemplary embodiment, a 48-bit serial-to-parallel shift register, not shown, is used to illuminate the front panel encoder light emitting diodes (FIG. 7). A 48-bit parallel-to-serial shift register, not shown, is used to sense encoder key switches of the encoder keyboard 66. The bits of switch data are shifted out of the encoder keyboard 66 by the input/output ports 45 for interpretation by the digital signal processor 35.

A decoder keyboard 86 selects emergency message acknowledgements, review and forwarding. Bits of light emitting diode data are shifted to the decoder keyboard 86 by the input/output ports 45 and then enabled to illuminate or flash light emitting diodes (FIG. 7). In the exemplary embodiment, a 16-bit parallel-to-serial shift register is used to sense the decoder key switches of the decoder keyboard 86. The bits of switch data sensed are shifted out of the decoder keyboard 86 by the input/output ports 45 and then interpreted by the digital signal processor 35. In the exemplary embodiment, a 16-bit parallel-to-serial shift register, not shown, is used to sense the decoder key switches.

An audio input expander 90 provides additional audio input channels. It comprises channel connectors similar to channel connectors 16 and 17; balanced audio amplifiers similar to balanced audio amplifiers 20 and 21; audio switches similar to audio switches 25–27; and a codec similar to codec 30. The audio input expander 90 also includes a random access memory and a read-only program memory. The field programmable gate array 53 generates all internal timing signals and controls all internal digital signal routing. The digital signal processor 35 controls all input/output signals for the audio input expander 90 in the manner described for signals applied to the audio channel connectors 16 and 17.

A key is provided to change the operating modes of the encoder/decoder 10 (FIG. 7). Each time the key is activated, the encoder/decoder 10 changes its mode between a manual operation and an automatic operation with password protection. Each activation of the change of mode key is sensed by the digital signal processor 35 for the changing of the mode of the encoder/decoder 10 between a manual operation and an automatic operation.

A password is used to access the encoder operational mode. The password is stored in the system random access memory 62. A password key (FIG. 7) enables entry to the operational level. An operator enters the password digits to the digital signal processor 35 through the encoder keyboard 66. The keys therefor are shown under LOCATION(S) (FIG. 7). The digital signal processor 35 compares the entered digits with the password code stored in the system random access memory 62. If the password code entered by an operator matches the password code stored in the system random access memory 62, then the digital signal processor 35 validates the coded entry of digits to enable the operator to access the encoder/decoder 10.

The encoder/decoder 10 of the present invention enables periodic tests for checking the operation thereof. In the exemplary embodiment, weekly and monthly tests are employed for checking the operation of the encoder/decoder 10. In the event a weekly test is not transmitted within a prescribed time period, then the digital signal processor 35 will cause the printer 53 to printout a reminder that the weekly test has not been transmitted. In the event a weekly test has not been received within a prescribed time period, then the digital signal processor 35 will cause the printer 53 to print out a reminder that a weekly test has not been received. In the exemplary embodiment, the time period is eight days after the last weekly test has been transmitted or received. The reminder message is stored in the random access memory 62.

In a similar manner, should not a monthly test be transmitted within a month within a prescribed time period, then the digital signal processor 35 will cause the printer 53 to print out a reminder that the monthly test has not been transmitted. Should the monthly test not be received within a prescribed time period, then the digital signal processor 35 will cause the printer 53 to print out a reminder that a monthly test has not been received. In the exemplary embodiment, the time period is eight days after the expiration of the monthly period for which a monthly test was re-transmitted or a monthly test was received. The reminder message is stored in the random access memory 62.

As previously described, the real-time clock 55 under the control of the digital signal processor 35 maintains a calendar and time of day, which is displayed on the front panel (FIG. 7).

The weekly and monthly test reminder is implemented in a software subroutine within the digital signal processor 35 on a time basis, for example, at least once a minute. As shown in FIG. 6, program variable transmission time is set to the current time plus eight days whenever a weekly or monthly test is transmitted by the encoder/decoder 10. Similarly, program variable transmission time is set to current time plus eight days whenever a weekly or monthly time is received.

Thereupon, the transmission time value is subtracted from the current time value. If the result is greater than 0, then eight or more days have elapsed since the last weekly or monthly test was transmitted. If so, then the message no weekly or monthly test was transmitted for eight days is printed by the printer 53. Similarly, the receiving time value is substracted from the current time value. If the result is greater than 0, then eight or more days have elapsed since the last weekly or monthly test was received. If so, then the message no weekly or monthly test was received from eight days is printed by the printer 53.

What is claimed is:

1. An encoder/decoder for an emergency alert system comprising:
   (a) audio input means for receiving audio voice alert message signals;
   (b) audio output means through which the audio voice alert message signals are forwarded; and
   (c) a digital signal processor for controlling the passage of the audio voice alert message signals from said audio input means to said audio output means, said digital signal processor providing implementation of modulation and demodulation of said audio voice alert message signals for encoding and decoding voice emergency alert message with event data.

2. An encoder/decoder for an emergency alert system as claimed in claim 1 wherein said modulation by said digital signal processor is frequency shift key modulation and wherein said demodulation implementation by said digital signal processor is frequency shift key demodulation.

3. An encoder/decoder for an emergency alert system as claimed in claim 2 wherein said digital signal processor includes a delay and multiplication for the demodulation by said digital signal processor to improve signal to noise ratio performance and for tolerance to distortion of the reception of the audio alert message signals.

4. An encoder/decoder for an emergency alert system as claimed in claim 3 wherein said frequency shift key demodulation provides detection of mark and space frequencies within the audio voice alert message signals, said mark and space frequencies being delayed and multiplied with the resulting products therefrom being added.

5. An encoder/decoder for an emergency alert system comprising:
   (a) audio input means, said audio input means including a plurality of audio channel connectors for receiving respectively a plurality of audio voice alert message signals;
   (b) audio output means through which audio voice alert message signals are forwarded; and
   (c) a digital signal processor for scanning said plurality of audio voice alert message signals and for controlling the passage of the audio voice alert message signals from said audio input means to said audio output means, said digital signal processor providing implementation of modulation and demodulation of said audio voice alert message signals.

6. An encoder/decoder for an emergency alert system comprising:
   (a) audio input means for receiving audio input message signals comprising coded digital location signals and voice message signals;
   (b) audio output means through which voice message signals are forwarded; and
   (c) a digital signal processor for validating the coded digital location signals and in response to the validation of said coded digital location signals forwards the voice message signals to said audio output means, said digital signal processor providing implementation of modulation and demodulation of said audio alert message signals.

7. An encoder/decoder for an emergency alert system comprising:
   (a) audio input means, said audio input means including a plurality of audio channel connectors for receiving respectively a plurality of audio alert message signals, each of said audio alert signals comprising coded digital location signals and voice message signals;

(b) audio output means through which voice message signals are forwarded; and (c) a digital signal processor for scanning said plurality of audio alert message signals to determine the presence of an incoming signal representing an emergency alert message and for controlling the passage of audio alert message signals from said audio input means to said audio output means, said digital processor in response to the validation of said coded digital location signals forwards the voice message signals to said audio output means, said digital signal processor providing implementation of modulation and demodulation of said audio message signals.

8. An encoder/decoder for an emergency alert system as claimed in claim 6, said encoder/decoder further comprising memory means for storing coded signals to match with said coded digital location signals, said digital signal processor comparing said coded digital location signals with said coded signals stored in said memory means to determine the validation of said coded digital location signals.

9. An encoder/decoder for an emergency alert system as claimed in claim 7, said encoder/decoder further comprising memory means for storing coded signals to match with said coded digital location signals, said digital signal processor comparing said coded digital location signals with said coded signals stored in said memory means to determine the validation of said coded digital location signals.

10. An encoder/decoder for an emergency alert system comprising:

(a) audio input means for receiving audio input message signals comprising coded digital event signals and voice message signals;

(b) audio output means through which voice message signals are forwarded; and (c) a digital signal processor for validating the coded digital event signals and in response to the validation of said coded digital event signals forwards the voice message signals to said audio output means, said digital signal processor providing implementation of modulation and demodulation of said audio alert message signals for encoding and decoding emergency alert messages with event data.

11. An encoder/decoder for an emergency alert system comprising:

(a) audio input means, said audio input means including a plurality of audio channel connectors for receiving respectively a plurality of audio alert message signals, each of said audio alert signals comprising coded digital event signals and voice message signals;

(b) audio output means through which voice message signals are forwarded; and (c) a digital signal processor for scanning said plurality of audio alert message signals to determine the presence of an incoming signal representing an emergency alert message and for controlling the passage of audio alert message signals from said audio input means to said audio output means, said digital processor in response to the validation of said coded digital event signals forwards the voice message signals to said audio output means, said digital signal processor providing implementation of modulation and demodulation of said audio message signals.

12. An encoder/decoder for an emergency alert system as claimed in claim 6, said encoder/decoder further comprising memory means for storing coded signals to match with said coded digital location signals, said digital signal processor comparing said coded digital location signals with said coded signals stored in said memory means to determine the validation of said coded digital location signals.

13. An encoder/decoder for an emergency alert system as claimed in claim 11, said encoder/decoder further comprising memory means for storing coded signals to match with said coded event signals, said digital signal processor comparing said coded digital event signals with said coded signals stored in said memory means to determine the validation of said coded digital event signals.

14. An encoder/decoder for an emergency alert system comprising:

(a) audio input means for receiving audio alert message signals;

(b) audio output means through which the audio alert message signals are transmitted;

(c) display means for displaying an operational reminder test message for checking the operation of said encoder/decoder; and (d) a digital signal processor for controlling the passage of the audio alert message signals from said audio input means through said audio output means, said digital signal processor controlling the operation of said display means for displaying an operational reminder test message for said encoder/decoder in response to said audio output means not transmitting an operational test message for said encoder/decoder within a prescribed period of time.

15. A encoder/decoder for an emergency alert system as claimed in claim 14 in which said digital signal processor implements timing operations.

16. An encoder/decoder for an emergency alert system as claimed in claim 15 and comprising memory means for storing an operational reminder test message for said encoder/decoder, said digital signal processor communicating with said memory means and said display means for displaying an operational reminder test message for checking the operation of said encoder/decoder in response to said audio output means not transmitting an operational test message for said encoder/decoder within a prescribed period of time.

17. An encoder/decoder for an emergency alert system as claimed in claim 14 and comprising memory means for storing an operational reminder test message for checking the operation of said encoder/decoder, said digital signal processor communicating with said memory means and said display means for displaying an operational reminder test message for said encoder/decoder in response to said audio output means not transmitting an operational test message for said encoder/decoder within a prescribed period of time.

18. An encoder/decoder for an emergency alert system comprising:

(a) audio input means for receiving audio alert message signals;

(b) audio output means through which the audio alert message signals are forwarded for transmission;

(c) display means for displaying an operational reminder test message for checking the operation of said encoder/decoder; and (d) a digital signal processor for controlling the passage of the audio alert message signals from said audio input means through said audio output means, said digital signal processor controlling the operation of said display means for displaying an operational reminder test message for said encoder/decoder in response to said audio input means not receiving an operational test message for said encoder/decoder within a prescribed period of time.

19. An encoder/decoder for an emergency alert system as claimed in claim 18 in which said digital signal processor implements timing operations.

20. An encoder/decoder for an emergency alert system as claimed in claim 19 and comprising memory means for storing an operational reminder test message for checking the operation of said encoder/decoder, said digital signal processor communicating with said memory means and said display means for displaying an operational reminder test message for said encoder/decoder in response to said audio input means not receiving an operational test message for said encoder/decoder within a prescribed period of time.

21. An encoder/decoder as claimed in claim 18 and comprising memory means for storing an operational reminder test message for checking the operation of said encoder/decoder, said digital signal processor communicating with said memory means and said display means for displaying an operational reminder test message for said encoder/decoder in response to said audio input means not receiving an operational test message for said encoder/decoder within a prescribed period of time.

* * * * *